Jan. 11, 1927. 1,614,234
M. K. DE TRAIRUN ET AL
PROCESS AND APPARATUS FOR IMPROVING THE EFFICIENCY
OF INTERNAL COMBUSTION ENGINES
Filed July 21, 1923    2 Sheets-Sheet 2
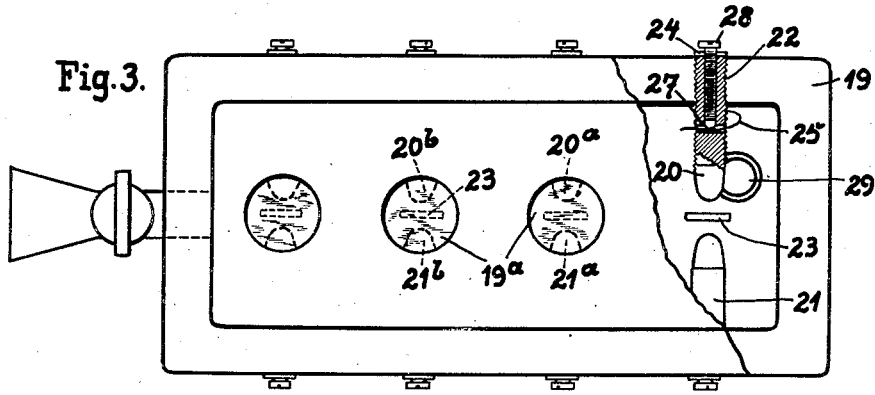
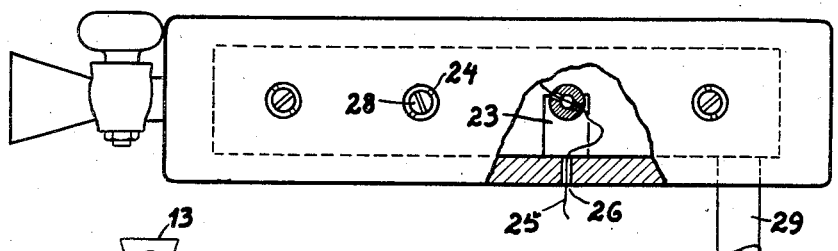
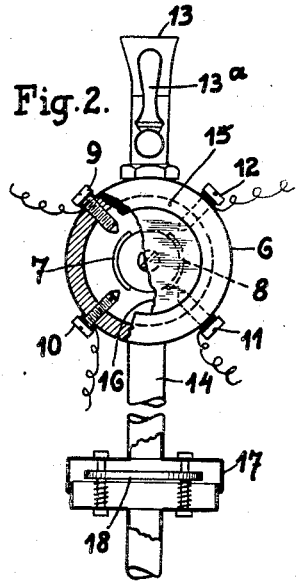
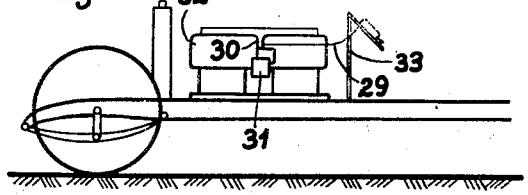
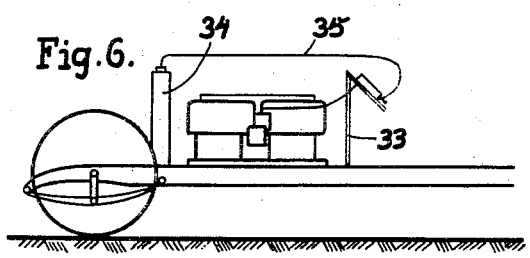
Inventors
M. K. de Trairun
H. Füsternitz
By Marks & Clerk
Attys.

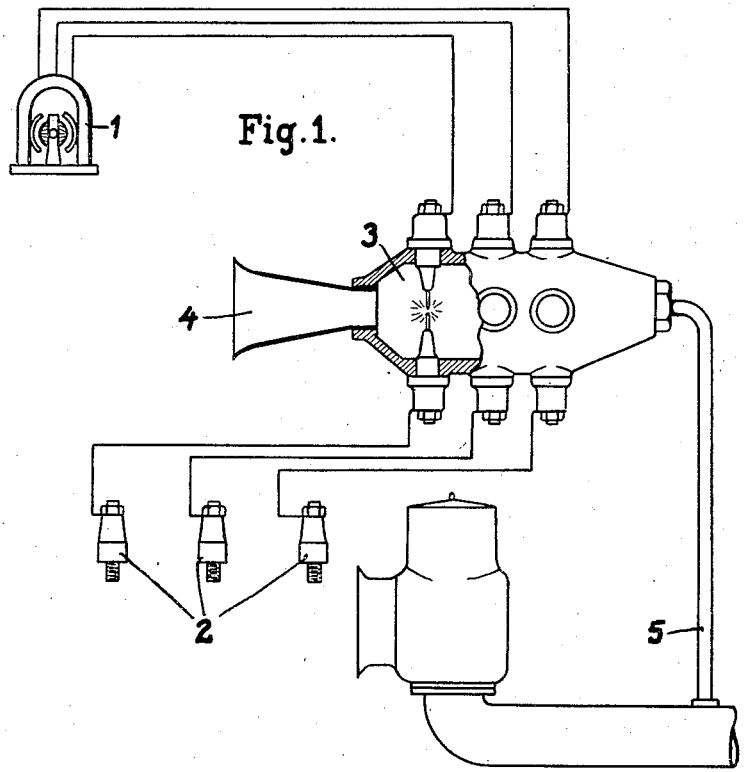

Patented Jan. 11, 1927.

1,614,234

UNITED STATES PATENT OFFICE.

MARTIN KRISTENSEN DE TRAIRUN, OF LONDON, ENGLAND, AND HERMANN JÜSTERNITZ, OF VIENNA, AUSTRIA.

PROCESS AND APPARATUS FOR IMPROVING THE EFFICIENCY OF INTERNAL-COMBUSTION ENGINES.

Application filed July 21, 1923, Serial No. 653,008, and in Austria September 19, 1922.

The invention is founded on the observation that engines for motor cars possess an essentially better efficiency when the motor car is moving in the morning and in the evening through a well wooded country. The invention consists in creating more or less the same conditions for the formation of the mixture as exist in nature in the above named circumstances.

According to the invention this result is obtained by forming the gas mixture by means of ozonized air or by adding additional ozonized air to the already formed gas mixture.

Through electric discharges, sparks, the air is decomposed or, as it is called, ozonized, that is, it is transformed into ozone, the purest form of oxygen, and nitric oxide, which when added to the gas mixture already formed through the carburettor gives a clean explosion in the cylinders of considerably more violence than would have been the case, had the ozonized air not been added to the gas mixture.

Thorough experiments have proved that in this way a much higher efficiency of the engine is obtained and a much greater power can be gained from the engine.

Furthermore the formation of soot and carbon in the cylinders is obviously diminished by economically better utilizing the fuel. This is obtained by the arrangement of an ozonizing apparatus connected either directly with the air intake of the carburettor or with the tubing between the carburettor and the motor. This apparatus can be operated by a special electric dynamo or immediately by the current of a magneto and in this latter case the ozonizing apparatus is arranged in the electric circuit of the sparking plugs.

The accompanying drawing shows some modes of application.

Fig. 1 represents the general principle of the invention,

Fig. 2 shows a mode of construction for a two cylinder engine, e. g. of a motor cycle, partly in section, Fig. 3 is a front view of the principal part in a larger scale and partly in section (four cylinder engine), Fig. 4 is a side view of this principal part in the scale of Fig. 3, partly in section, Fig. 5 is a side view of the front part of a motor car with the apparatus, reduced in size.

Fig. 6 is the same view of a somewhat altered mode of execution.

The wires from the magneto 1 leading to the sparking plugs 2 are connected with an ozonizing apparatus 3 having at one end an opening or hopper 4 for the entrance of atmospheric air and at the opposite end a pipe 5 connected with the gas tubing between carburettor and motor. The air is ozonized by the sparks flashing across the open space between the electrodes as shown in Fig. 1, the ignition current being passed through the ozonizing apparatus before passing through the sparking plugs. Thus ozonized air may be added to the gas mixture from the carburettor or directly supplied to the carburettor.

A practical mode of construction of the invention is illustrated in Fig. 2 in its application to a two cylinder engine. In a casing 6 of insulating material are arranged metallic segments 7 and 8 and at a distance from these segments there are electrodes 9, 10, 11, 12. The electrodes 9 and 10 are placed in the ignition circuit of one cylinder and the electrodes 11 and 12 in the ignition circuit of the other cylinder. From the electrodes sparks flash continually on to the metallic segments 7 and 8 and inversely. By these sparks the air entering by a pipe or by a hopper 13 into the case 6 is ozonized and leaves the case by a pipe 14 entering the gas intake tube between the carburettor and the cylinders.

It is essential that in the cover 15 of the casing a window 16, e. g. of mica, is inserted. By this construction the sparks flashing from the electrodes to the segments 7 and 8 can be observed and, if necessary, regulated by adjusting the electrodes. This adjustment can be done by adding or by removing small washers or in any other suitable manner.

A disk 18 supported by springs and guided by bolts in a casing 17 prevents a too violent influx of ozonized air. A valve 13ª serves to cut off the air in case this be not needed.

The mode of construction as shown in Figs. 3 and 4 is destined for a four cylinder engine and shows a somewhat altered arrangement of the electrodes, of the means for their adjustment and of the arrangement of the electric cables and tube for conducting the ozonized air. In the elongated casing 19 are electrodes 20 and 21 inserted opposite to one another and adjustable by means of a thread 22. The pair of electrodes 20, 21 is destined for the electric circuit of the first cylinder and the pair of electrodes 20ª and 21ª for the electric circuit of the second cylinder etc. Between the electrodes and insulated from them a metallic piece 23 is inserted, so that a certain open space remains between it and the electrodes. The electrodes have a notch 24 for regulating the distance from the metallic piece 23 by a rotation of the electrodes by means of a screw driver. The wires 25 of the ignition circuit of a cylinder are preferably introduced through an opening 26 in the casing 19 and are inserted into the electrode through a cross bore hole, where they are clamped by means of a screw 28 which is placed in a longitudinal bore hole. A certain play of the wires 25 permits at the same time a rotation of the electrodes for regulating their distance from the metal piece 23. For each pair of electrodes observation windows 19ª are provided. The ozonized air is preferably conducted by a pipe 29, which is suitably vertically branched from the casing 19 and the air is conducted to the gas pipe 30 between the carburettor 31 and the cylinders 32. This construction permits a particularly favorable arrangement of the ozonizing apparatus on the dash board 33 of the motor car, where its function can be continually controlled, as Fig. 5 diagrammatically shows.

A further advantage of the device is that the igniting sparks in the sparking plug are increased in violence by the interruptions in the ozonizer thus securing the regularity of the working of the sparking plugs.

But even the great advantage mentioned can be increased through passing through the ozonizing chamber moist air or vapour laden air as for instance taken from the top of the radiator 34 by means of a tube 35 (Fig. 6). The result is then that a mixture of ozone, nitric oxide and hydrogen is added to the gas mixture. As this mixture of ozone and hydrogen in itself possesses explosive qualities it is clear that this mixture added to the gas mixture will give increased violence in explosion, in other words, more power without an extra quantity of fuel.

Having thus described our invention, we claim as new and desire to secure by Letters Patent:

1. Apparatus for improving the efficiency of internal combustion engines of motor vehicles, including a small closed casing adapted to be placed on the instrument board of the motor vehicle, a conduit placing the interior of said casing in communication with the intake manifold of the engine, an air inlet for said casing, means for regulating the passage of air through said inlet, radially arranged electrodes connected to said casing and adjustable toward the center of the casing, semi-circular central electrodes arranged in the casing and each adapted to cooperate with two of the first mentioned electrodes for ozonizing the air in the casing, and means for energizing said electrodes.

2. Apparatus for increasing the efficiency of internal combustion engines mounted on motor vehicles including a small closed casing adapted to be placed on the instrument board of the vehicle, a conduit placing the interior of the casing in communication with the intake manifold of the engine, an air inlet for the casing, means for regulating the passage of air through said inlet, and outer electrodes adjustable in the casing and movable toward and away from the central portion of the casing, each two outer electrodes being interposed in circuit with the spark plug of each cylinder.

In testimony whereof we affix our signatures.

MARTIN KRISTENSEN de TRAIRUN.
Ing. HERMANN JÜSTERNITZ.